(12) United States Patent
Fujii

(10) Patent No.: US 11,207,979 B2
(45) Date of Patent: Dec. 28, 2021

(54) DRIVE DEVICE FOR VEHICLE

(71) Applicant: JTEKT CORPORATION, Osaka (JP)

(72) Inventor: Noriyuki Fujii, Hekinan (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/071,123

(22) Filed: Oct. 15, 2020

(65) Prior Publication Data

US 2021/0122239 A1 Apr. 29, 2021

(30) Foreign Application Priority Data

Oct. 29, 2019 (JP) .............................. JP2019-196272

(51) Int. Cl.
| | | |
|---|---|---|
| *B60K 23/04* | (2006.01) | |
| *B60K 17/346* | (2006.01) | |
| *B60K 6/52* | (2007.10) | |
| *B60K 1/00* | (2006.01) | |
| *B60K 7/00* | (2006.01) | |
| *B60K 17/356* | (2006.01) | |
| *F16D 11/14* | (2006.01) | |
| *F16D 11/00* | (2006.01) | |

(52) U.S. Cl.
CPC ............ *B60K 17/3462* (2013.01); *B60K 6/52* (2013.01); *B60K 17/356* (2013.01); *B60K 2001/001* (2013.01); *B60K 2007/0092* (2013.01); *F16D 11/14* (2013.01); *F16D 2011/004* (2013.01)

(58) Field of Classification Search
CPC .................. B60K 17/3462; B60K 6/52; B60K 2001/001; B60K 2007/0092; B60K 17/356; F16D 11/14; F16D 2011/004
See application file for complete search history.

(56) References Cited

U.S. PATENT DOCUMENTS

| | | | | |
|---|---|---|---|---|
| 2,348,717 A | * | 5/1944 | Banker | F16D 11/10 192/69.83 |
| 2,450,896 A | * | 10/1948 | Kimberly, Jr. | F16D 11/10 192/69.91 |
| 6,378,638 B1 | * | 4/2002 | Mizon | B60K 6/54 180/65.6 |
| 2003/0037977 A1 | | 2/2003 | Tatara et al. | |
| 2003/0188949 A1 | * | 10/2003 | Porter | F16D 21/06 192/103 F |
| 2020/0040967 A1 | * | 2/2020 | Engerman | B60K 17/165 |
| 2020/0317064 A1 | * | 10/2020 | Lee | F16D 23/12 |

FOREIGN PATENT DOCUMENTS

JP 2003-63265 A 3/2003

* cited by examiner

*Primary Examiner* — Justin Holmes
(74) *Attorney, Agent, or Firm* — Oblon, McClelland, Maier & Neustadt, L.L.P.

(57) ABSTRACT

A drive device for a vehicle includes an electric motor, a speed reduction device configured to reduce the speed of rotation transferred from the electric motor, and a drive force distribution device that distributes and outputs a drive force of the electric motor that is input via the speed reduction device to a first output rotary member and a second output rotary member. The speed reduction device has a first gear member, a second gear member, a coupling member, and a moving mechanism.

4 Claims, 7 Drawing Sheets

DRIVE DEVICE FOR VEHICLE

CROSS-REFERENCE TO RELATED APPLICATION

This application claims priority to Japanese Patent Application No. 2019-196272 filed on Oct. 29, 2019, incorporated herein by reference in its entirety.

BACKGROUND

1. Technical Field

The present disclosure relates to a drive device for a vehicle.

2. Description of Related Art

In some four-wheel-drive vehicles according to the related art in which front wheels and rear wheels can be driven, the front wheels are driven by an engine, and the rear wheels are driven by a drive force of an electric motor (see Japanese Unexamined Patent Application Publication No. 2003-63265 (JP 2003-63265 A), for example).

The four-wheel-drive vehicle described in JP 2003-63265 A includes a drive force distribution device that distributes a drive force of an electric motor to right and left rear wheels. The drive force distribution device has a speed reduction gear that reduces the speed of rotation of the electric motor, a first clutch interposed between the speed reduction gear and the left rear wheel, and a second clutch interposed between the speed reduction gear and the electric motor and the right rear wheel. The first and second clutches are each a multi-plate clutch of a wet type in which frictional sliding between clutch plates is lubricated with lubricating oil. The degree of engagement of the first and second clutches is controlled by clutch control means based on a vehicle state such as the vehicle speed, the accelerator operation amount, the brake depression force, the steering angle of steering wheels, and the yaw rate.

SUMMARY

When the four-wheel-drive vehicle described in JP 2003-63265 A travels using only a drive force of an engine with a current to be supplied to the electric motor blocked, the rotational resistance of the electric motor causes a loss to lower the dynamic performance and the fuel efficiency if the electric motor is rotated in a following manner by a reverse input due to rotation of the rear wheels, and therefore it is conceivable to disengage the first and second clutches. Depending on conditions such as the vehicle speed and the temperature, however, drag torque may be increased because of the viscosity of lubricating oil that is present between clutch plates of the first and second clutches, and the drag torque may lower the dynamic performance and the fuel efficiency.

The present disclosure provides a drive device for a vehicle, the drive device being capable of suppressing a power loss caused by a rotational resistance due to a reverse input from wheels.

A first aspect of the present disclosure provides a drive device for a vehicle, including: an electric motor; a speed reduction device that reduces a speed of rotation transferred from the electric motor; and a drive force distribution device that distributes and outputs a drive force of the electric motor that is input via the speed reduction device to a first output rotary member and a second output rotary member. The speed reduction device includes a first gear member having a first gear portion that has a first pitch circle diameter, a second gear member supported coaxially with the first gear member so as to be rotatable relative to the first gear member and having a second gear portion that has a second pitch circle diameter that is different from the first pitch circle diameter, a coupling member disposed so as to be movable in an axial direction between a non-coupled position at which the coupling member is meshed with only one of the first and second gear members and a coupled position at which the coupling member is meshed with both the gear members, and a moving mechanism configured to move the coupling member in the axial direction.

With the configuration described above, it is possible to suppress a power loss caused by a rotational resistance due to a reverse input from wheels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of the present disclosure will be described with reference to FIGS. 1 to 6. The embodiments described below are provided as suitable specific examples for carrying out the present disclosure, and include portions that specifically implement a variety of technical matters that are technically preferable. However, the technical scope of the present disclosure is not limited to such specific aspects.

Configuration of Four-Wheel-Drive Vehicle

Figure 1:
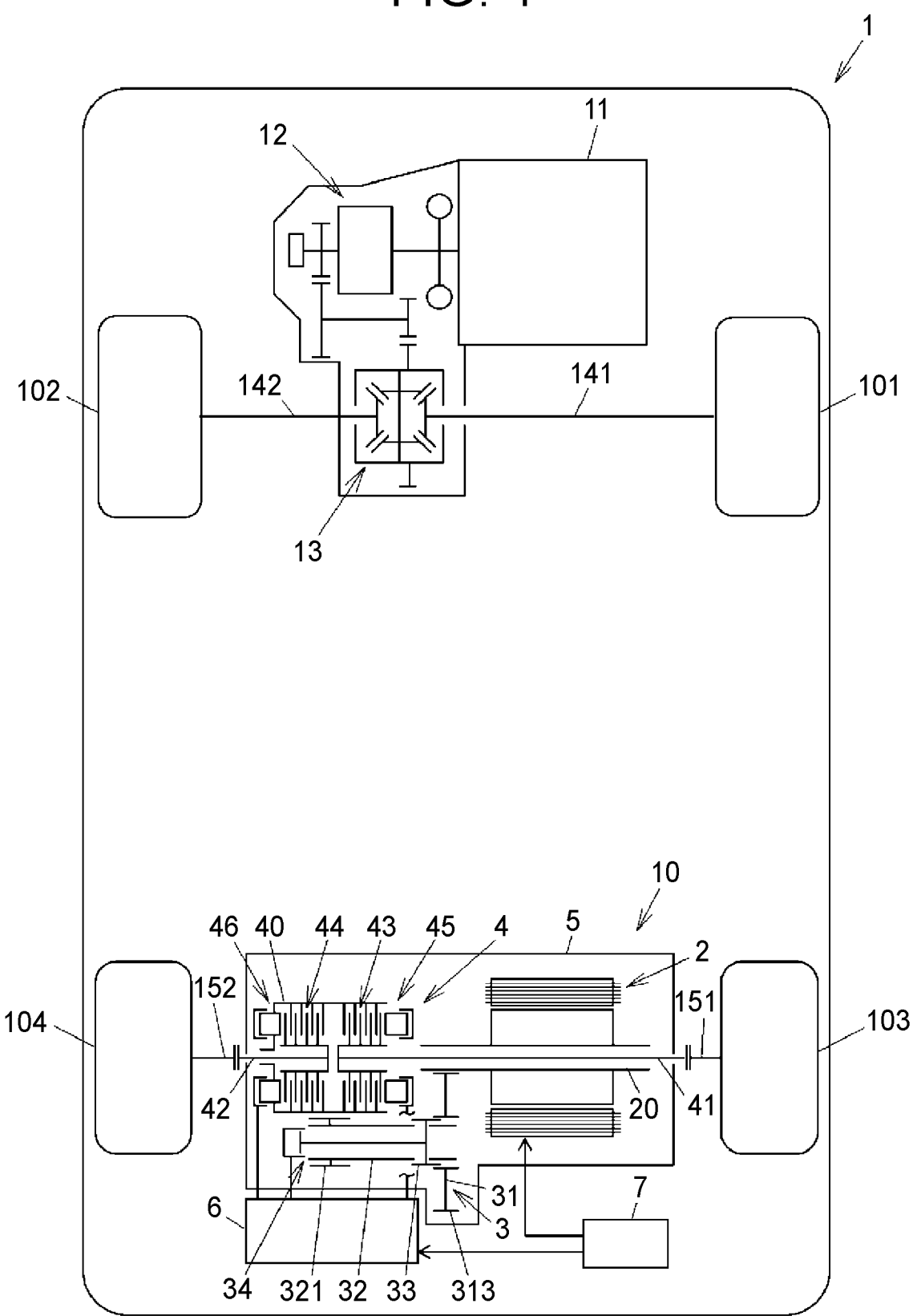
FIG. 1 is a schematic diagram illustrating an example of a schematic configuration of a four-wheel-drive vehicle on which a drive device is mounted according to a first embodiment of the present disclosure.

FIG. 1 is a schematic diagram illustrating an example of a schematic configuration of a four-wheel-drive vehicle on which a drive device is mounted according to a first embodiment of the present disclosure. A four-wheel-drive vehicle 1 includes a right front wheel 101 and a left front wheel 102 as main drive wheels driven by a drive force of an engine 11 as a main drive source, and a right rear wheel 103 and a left rear wheel 104 as auxiliary drive wheels driven by a drive device 10 that has an electric motor 2 as an auxiliary drive source. A wheel speed sensor is attached in correspondence with each of the right front wheel 101 and the left front wheel 102 and the right rear wheel 103 and the left rear wheel 104.

The drive force of the engine 11 is transferred from a transmission 12 to a differential device 13, and distributed from the differential device 13 to the right front wheel 101 and the left front wheel 102 via right and left drive shafts 141 and 142, respectively. A drive force is transferred from the drive device 10 to the right rear wheel 103 and the left rear wheel 104 via right and left drive shafts 151 and 152, respectively. The main drive source may be a high-output electric motor, and may be of a so-called hybrid type in which an engine and a high-output electric motor are combined with each other.

The drive device 10 includes: an electric motor 2 that generates a drive force for driving the right rear wheel 103 and the left rear wheel 104; a speed reduction device 3 that reduces the speed of rotation transferred from an output shaft 20 of the electric motor 2; a drive force distribution device 4 that distributes and outputs a drive force input from the electric motor 2 via the speed reduction device 3 to first and second output rotary members 41 and 42; a housing 5 and a hydraulic unit 6 fixed to the vehicle body; and a control device 7 that controls the electric motor 2 and the drive force distribution device 4. The drive shaft 151 which transfers a drive force to the right rear wheel 103 is coupled to the first output rotary member 41. The drive shaft 152 which transfers a drive force to the left rear wheel 104 is coupled to the second output rotary member 42.

Configuration of Drive Device

Figure 2:
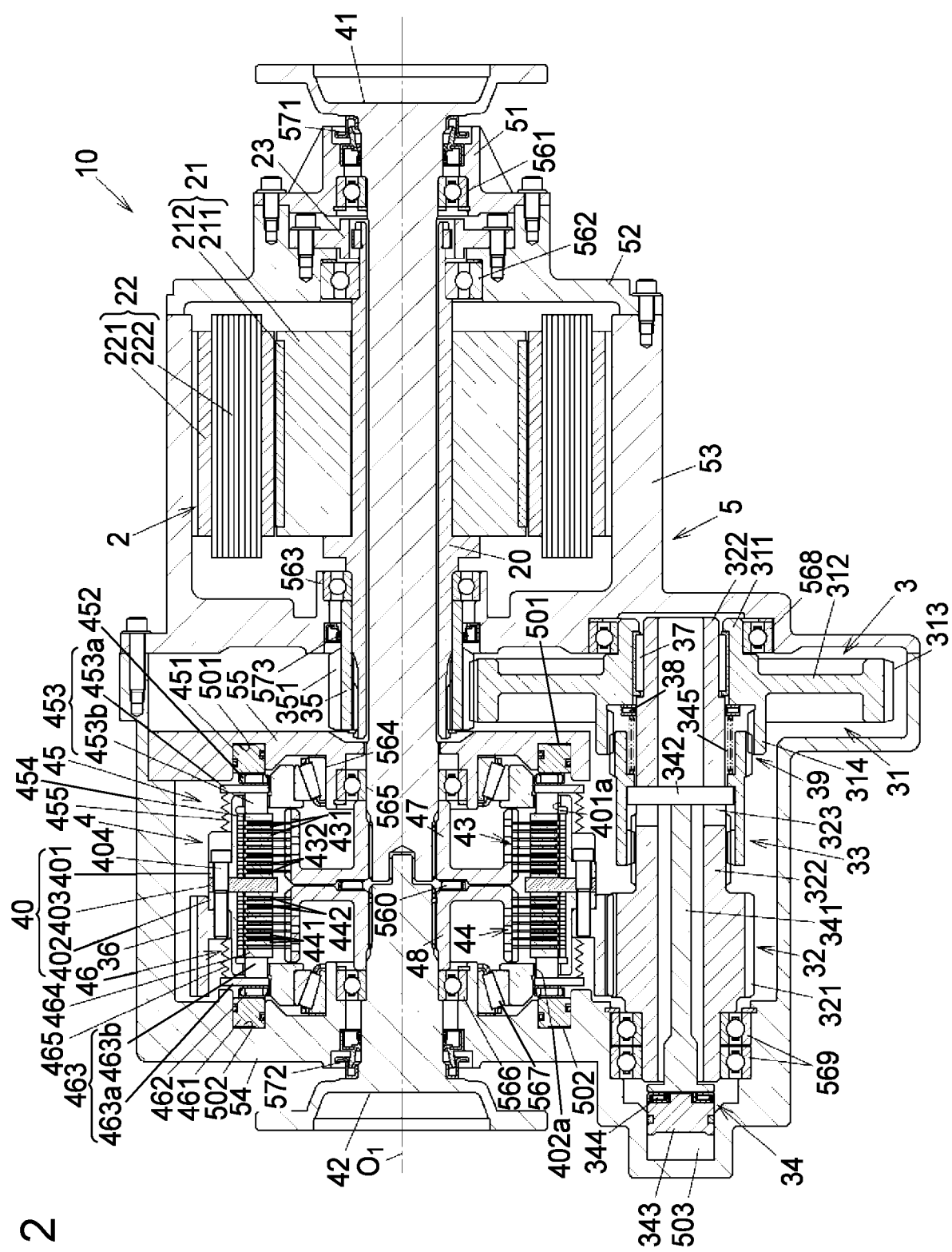
FIG. 2 is a sectional view illustrating an example of the configuration inside a housing of the drive device.

FIG. 2 is a sectional view illustrating an example of the configuration of the inside of the housing 5 of the drive device 10. The left side of FIG. 2 corresponds to the left side of the four-wheel-drive vehicle 1. The right side of FIG. 2 corresponds to the right side of the four-wheel-drive vehicle 1. The housing 5 has first to fifth housing members 51 to 55. The housing members 51 to 55 are fixed to each other by a plurality of bolts. Rolling bearings 560 to 569 that smooth rotation of various portions and seal members 571 to 573 that suppress leakage of lubricating oil sealed in the housing 5 and entry of foreign matter are disposed at appropriate locations inside the housing 5.

The electric motor 2 has: an output shaft 20 having a hollow tube shape; a rotor 21 that rotates together with the output shaft 20; a stator 22 disposed at the outer periphery of the rotor 21; and a rotation sensor 23 that detects rotation of the output shaft 20. The rotor 21 has a rotor core 211 and a plurality of permanent magnets 212 fixed to the rotor core 211. The stator 22 has a stator core 221 and windings 222 for a plurality of phases wound around the stator core 221. Three-phase alternating current (AC) motor currents, for example, are supplied from the control device 7 to the windings 222 for the plurality of phases to rotate the rotor 21 with respect to the stator 22 with torque that matches the magnitude of the motor currents.

The drive force distribution device 4 includes: an input rotary member 40 to which a drive force of the electric motor 2 is input from the speed reduction device 3; the first and second output rotary members 41 and 42; a first multi-plate clutch 43 composed of a plurality of clutch plates disposed between the input rotary member 40 and the first output rotary member 41; a second multi-plate clutch 44 composed of a plurality of clutch plates disposed between the input rotary member 40 and the second output rotary member 42; a first pressing mechanism 45 that presses the first multi-plate clutch 43; and a second pressing mechanism 46 that presses the second multi-plate clutch 44.

In the present embodiment, in addition, a first clutch hub 47 is interposed between the first multi-plate clutch 43 and the first output rotary member 41, and a second clutch hub 48 is interposed between the second multi-plate clutch 44 and the second output rotary member 42. The first output rotary member 41 is spline-fitted with the first clutch hub 47 to rotate together with the first clutch hub 47. The second output rotary member 42 is spline-fitted with the second clutch hub 48 to rotate together with the second clutch hub 48.

The input rotary member 40, the first output rotary member 41, and the second output rotary member 42 are relatively rotatable with respect to each other about a rotational axis $O_1$ that extends along the vehicle right-left direction. The first multi-plate clutch 43 and the second multi-plate clutch 44 are each a multi-plate clutch of a wet type in which frictional sliding between clutch plates to be discussed later is lubricated with lubricating oil sealed in the housing 5. Hereinafter, the direction which is parallel to the rotational axis $O_1$ will be referred to as an "axial direction".

The input rotary member 40 has: a first clutch drum 401 disposed at the outer periphery of the first clutch hub 47; a second clutch drum 402 disposed at the outer periphery of the second clutch hub 48; a center plate 403 disposed between the first clutch drum 401 and the second clutch drum 402; and a plurality of bolts 404. The bolts 404 couple the first clutch drum 401, the second clutch drum 402, and the center plate 403 so as to be relatively non-rotatable, and fix these components to a ring gear 36 of the speed reduction device 3 to be discussed later.

The first multi-plate clutch 43 is composed of a plurality of first input clutch plates 431 that rotates together with the first clutch drum 401 and a plurality of first output clutch plates 432 that rotates together with the first clutch hub 47. The first input clutch plates 431 and the first output clutch plates 432 are disposed alternately along the axial direction. The first input clutch plates 431 are movable in the axial direction and relatively non-rotatable with respect to the first clutch drum 401 through spline engagement with the first clutch drum 401. The first output clutch plates 432 are movable in the axial direction and relatively non-rotatable with respect to the first clutch hub 47 through spline engagement with the first clutch hub 47.

The second multi-plate clutch 44 is composed of a plurality of second input clutch plates 441 that rotates together with the second clutch drum 402 and a plurality of second output clutch plates 442 that rotates together with the second clutch hub 48. The second input clutch plates 441 and the second output clutch plates 442 are disposed alternately along the axial direction. The second input clutch plates 441 are movable in the axial direction and relatively non-rotatable with respect to the second clutch drum 402 through spline engagement with the second clutch drum 402. The second output clutch plates 442 are movable in the axial direction and relatively non-rotatable with respect to the second clutch hub 48 through spline engagement with the second clutch hub 48.

The first pressing mechanism 45 has: a ring-shaped piston 451 that receives a hydraulic pressure supplied from the hydraulic unit 6; a thrust roller bearing 452 disposed side by side with the piston 451 in the axial direction; a plunger 453 that receives a pressing force of the piston 451 via the thrust roller bearing 452 and that rotates together with the input rotary member 40; a pressing plate 454 disposed on the inner side of the first clutch drum 401; and a return spring 455 that abuts against the plunger 453.

A part of the piston 451 in the axial direction is housed in a first hydraulic chamber 501 having an annular shape in the fifth housing member 55. The piston 451 presses the first multi-plate clutch 43 using the pressure of working oil supplied from the hydraulic unit 6. The plunger 453 integrally has an annular portion 453a having a circular ring shape and a plurality of columnar pressing projections 453b that projects in the axial direction from the annular portion 453a toward the first multi-plate clutch 43. The pressing projections 453b are inserted through respective through holes 401a provided in the first clutch drum 401. The distal end portions of the pressing projections 453b abut against the pressing plate 454. The return spring 455 abuts against the annular portion 453a to bias the plunger 453 toward the fifth housing member 55.

The second pressing mechanism 46 has: a ring-shaped piston 461 that receives a hydraulic pressure supplied from the hydraulic unit 6; a thrust roller bearing 462 disposed side by side with the piston 461 in the axial direction; a plunger 463 that receives a pressing force of the piston 461 via the thrust roller bearing 462 and that rotates together with the input rotary member 40; a pressing plate 464 disposed on the inner side of the second clutch drum 402; and a return spring 465 that abuts against the plunger 463.

A part of the piston 461 in the axial direction is housed in a second hydraulic chamber 502 having an annular shape in the fourth housing member 54. The piston 461 presses the second multi-plate clutch 44 using the pressure of working oil supplied from the hydraulic unit 6. The plunger 463 integrally has an annular portion 463a and a plurality of columnar pressing projections 463b. The pressing projections 463b are inserted through respective through holes 402a provided in the second clutch drum 402 to abut against the pressing plate 464. The return spring 465 abuts against the annular portion 463a to bias the plunger 463 toward the fourth housing member 54.

The first multi-plate clutch 43 transfers a drive force from the first clutch drum 401 to the first clutch hub 47 using a friction force between the first input clutch plates 431 and the first output clutch plates 432. The drive force which is transferred through the first multi-plate clutch 43 is larger as a pressing force generated by the first pressing mechanism 45 is larger. The second multi-plate clutch 44 transfers a drive force from the second clutch drum 402 to the second clutch hub 48 using a friction force between the second input clutch plates 441 and the second output clutch plates 442. The drive force which is transferred through the second multi-plate clutch 44 is larger as a pressing force generated by the second pressing mechanism 46 is larger.

Configuration of Speed Reduction Device

Next, the configuration of the speed reduction device 3 will be described with reference to FIGS. 3A to 5. The speed reduction device 3 is switchable between an engaged state in which the drive force of the electric motor 2 is transferred to the drive force distribution device 4 and a disengaged state in which the input rotary member 40 of the drive force distribution device 4 and the output shaft 20 of the electric motor 2 are disengaged from each other. In a two-wheel-drive state in which the four-wheel-drive vehicle 1 travels using only the drive force of the engine 11, rotation of the electric motor 2 due to a reverse input from the right and left rear wheels 103 and 104 can be suppressed by bringing the speed reduction device 3 into the disengaged state, which can suppress lowering of the dynamic performance and the fuel efficiency due to a loss caused by the rotational resistance of the electric motor 2. During straight travel in the two-wheel-drive state, relative rotation between the first output rotary member 41 and the second output rotary member 42 can be suppressed to enhance straight travel stability, by bringing the speed reduction device 3 into the disengaged state and pressing the first and second multi-plate clutches 43 and 44 using the first and second pressing mechanisms 45 and 46.

Figure 3A:
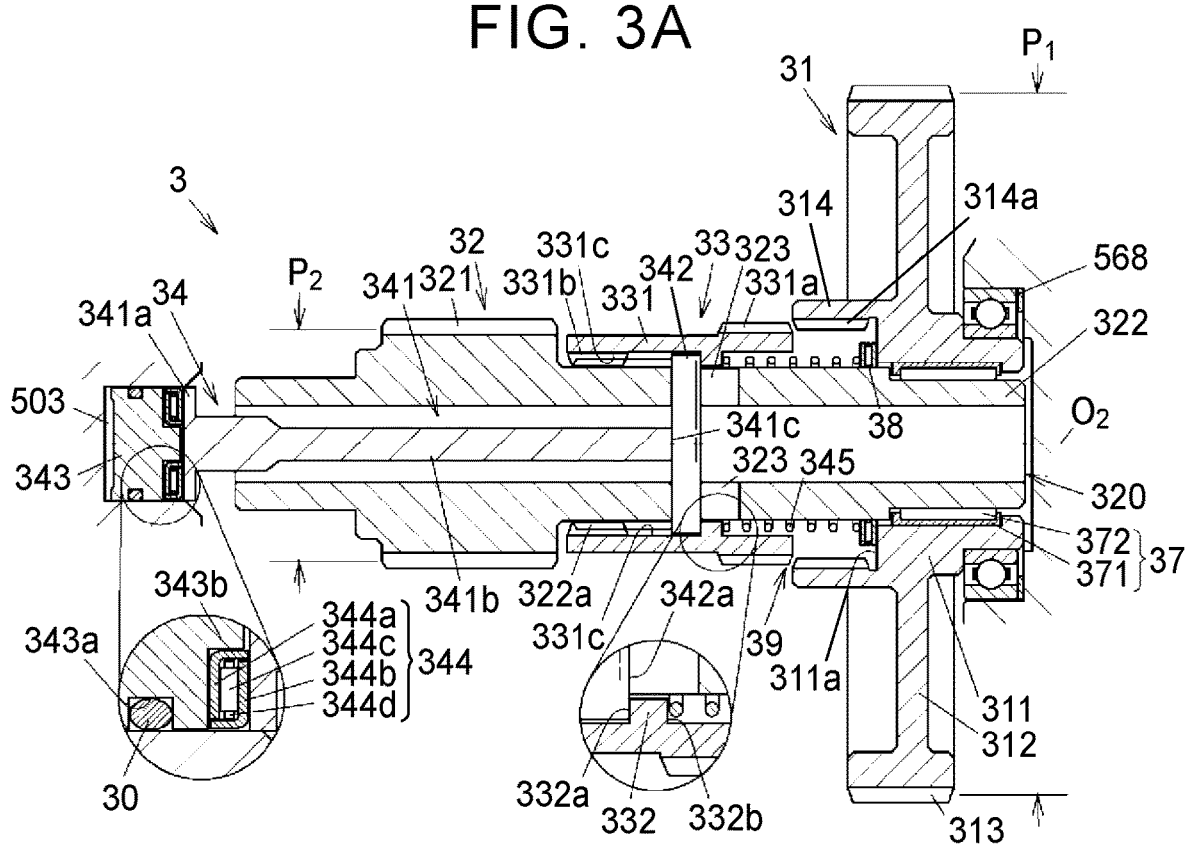
FIG. 3A is a sectional view of a speed reduction device in a disengaged state.
Figure 3B:
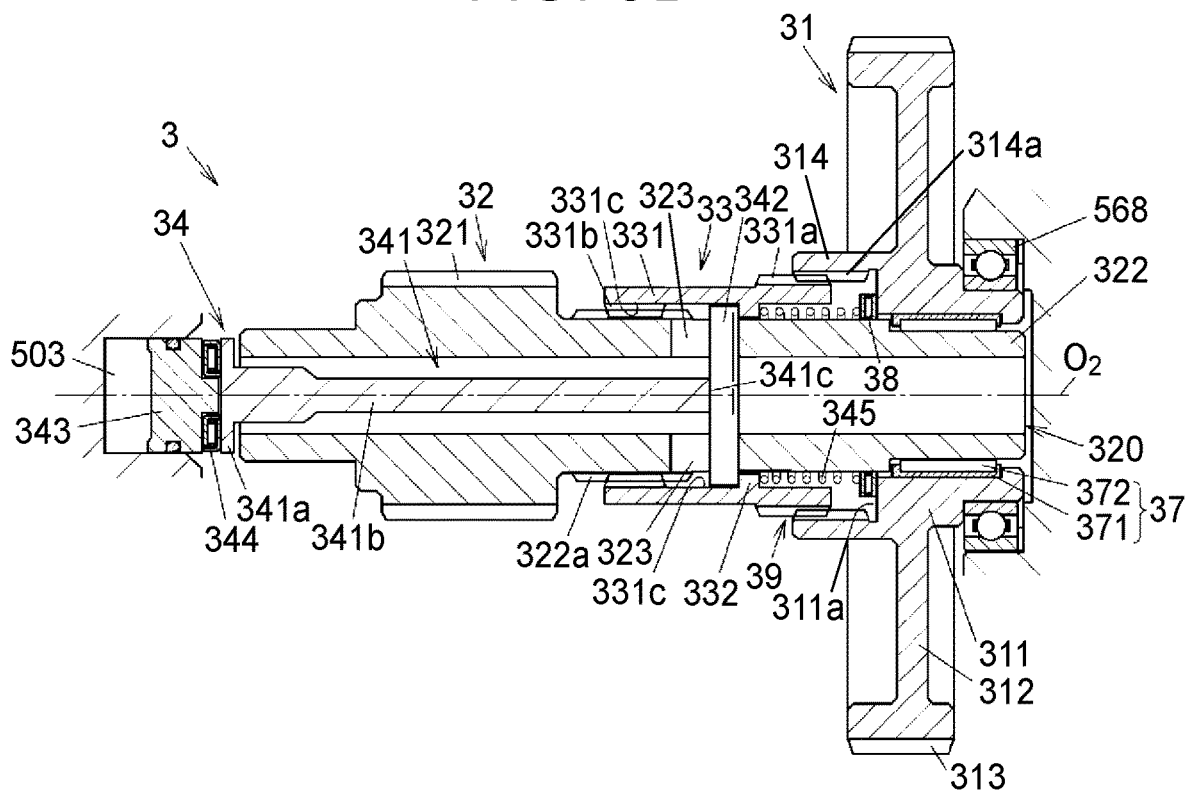
FIG. 3B is a sectional view of the speed reduction device in an engaged state.
Figure 4:
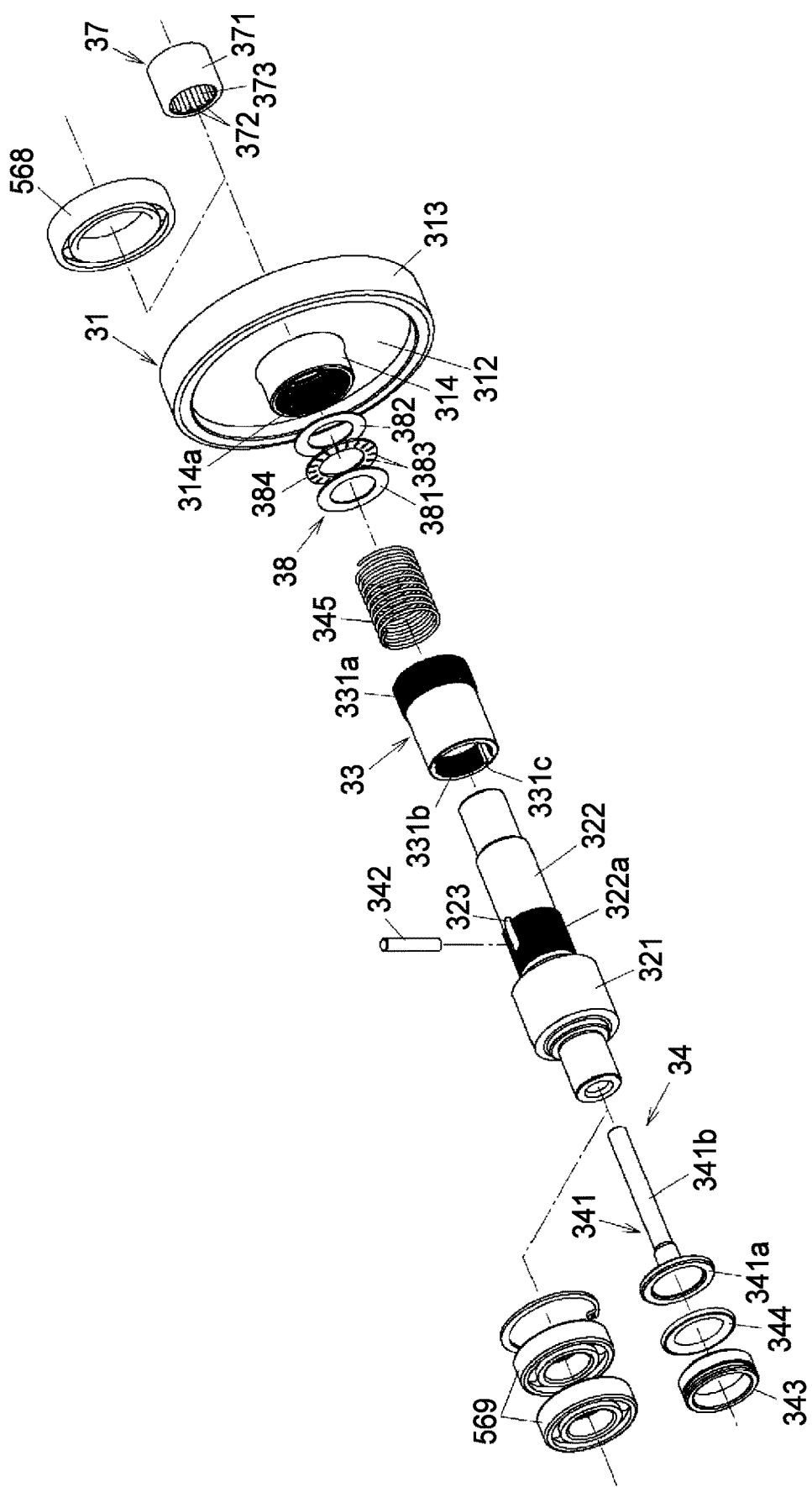
FIG. 4 is an exploded perspective view of the speed reduction device.
Figure 5:
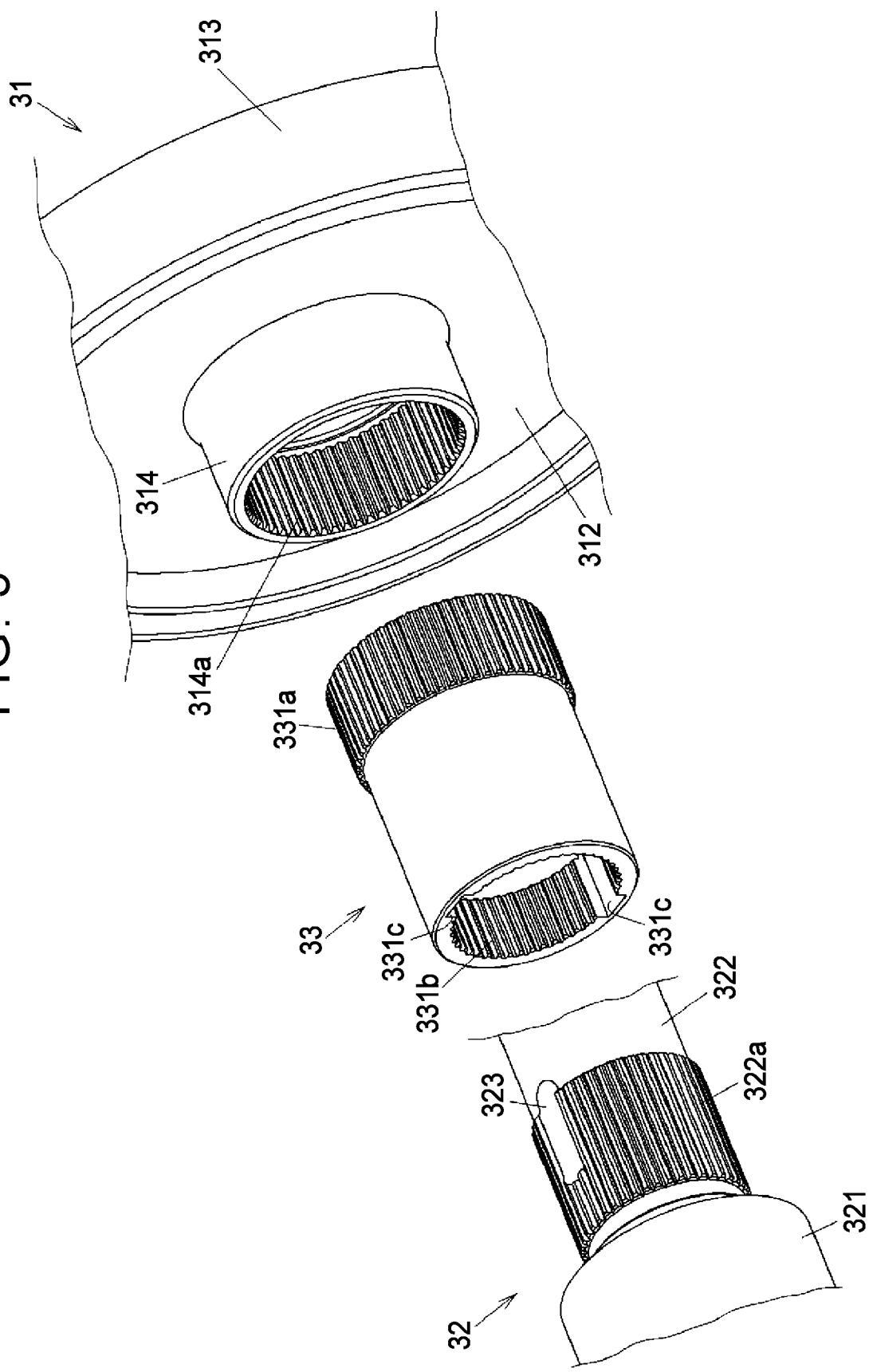
FIG. 5 is an enlarged view illustrating a part of FIG. 4 as enlarged.

FIG. 3A is a sectional view of the speed reduction device 3 in the disengaged state. FIG. 3B is a sectional view of the speed reduction device 3 in the engaged state. FIG. 4 is an exploded perspective view of the speed reduction device 3. FIG. 5 is an enlarged view illustrating a part of FIG. 4 as enlarged.

The speed reduction device 3 has: a first gear member 31 and a second gear member 32 supported coaxially with each other so as to be relatively rotatable; a coupling member 33 disposed so as to be movable in the axial direction with respect to the first and second gear members 31 and 32; a moving mechanism 34 that moves the coupling member 33 in the axial direction; a tubular pinion gear 35 (see FIG. 2) externally fitted at an end portion of the output shaft 20 of the electric motor 2 to rotate together with the output shaft 20; a ring gear 36 (see FIG. 2) fixed to the input rotary member 40; and a radial bearing 37 and a thrust bearing 38.

In the present embodiment, the first gear member 31 is disposed more toward the electric motor 2 than to the coupling member 33, the second gear member 32 is disposed more toward the drive force distribution device 4 than the coupling member 33 and, when the speed reduction device 3 is in the engaged state, the drive force of the electric motor 2 is transferred from the first gear member 31 to the second gear member 32 via the coupling member 33. In FIGS. 3A and 3B, a rotational axis $O_2$ of the first gear member 31 and the second gear member 32 is indicated by the long dashed short dashed line. The rotational axis $O_2$ is parallel to the rotational axis $O_1$ of the first and second output rotary members 41 and 42.

The first gear member 31 integrally has: a hub portion 311 supported by a rolling bearing 568 with respect to the housing 5; a disk portion 312 provided at the outer periphery of the hub portion 311; a first gear portion 313 provided at the outer periphery of the disk portion 312; and a cylindrical fitting portion 314 provided to project in the axial direction from one side surface 311a of the hub portion 311. Inner peripheral splines 314a composed of a plurality of spline teeth are provided on the inner peripheral surface of the fitting portion 314. The first gear portion 313 is meshed with a gear portion 351 provided at the outer periphery of the pinion gear 35.

The second gear member 32 has a cylindrical shape in which a shaft hole 320 is provided at the central portion thereof, and integrally has: a second gear portion 321 meshed with the ring gear 36; and a shaft portion 322 inserted through the inside of the coupling member 33 and the hub portion 311 of the first gear member 31. Long holes 323 that penetrate between the inner and outer peripheral surfaces of the second gear member 32 are provided in the shaft portion 322 so as to extend in the axial direction. In the present embodiment, two long holes 323 are provided so as to face each other with the rotational axis $O_2$ interposed therebetween.

One end portion of the second gear member 32 in the axial direction is supported on the housing 5 by a pair of rolling bearings 569 (see FIG. 2). The radial bearing 37 is disposed between the outer peripheral surface of the other end portion of the second gear member 32 and the inner peripheral surface of the hub portion 311. Outer peripheral splines 322a composed of a plurality of spline teeth are provided on the outer peripheral surface of the shaft portion 322. The shaft hole 320 penetrates the entire second gear member 32 in the axial direction. As illustrated in FIG. 4, the radial bearing 37 has a shell-type outer ring 371, a plurality of rollers 372 disposed on the inner side of the shell-type outer ring 371, and a cage 373 that holds the rollers 372.

A pitch circle diameter (first pitch circle diameter) $P_1$ of the first gear portion 313 is larger than a pitch circle diameter (second pitch circle diameter) $P_2$ of the second gear portion 321. The first gear portion 313 and the second gear portion 321 are provided with angled teeth, tooth ridges of which are inclined with respect to a direction that is parallel to the rotational axis $O_2$. In FIGS. 4 and 5, the tooth shapes of the first gear portion 313 and the second gear portion 321 are not illustrated.

The coupling member 33 is disposed so as to be movable in the axial direction between a non-coupled position, at which the coupling member 33 is meshed with only one of the first and second gear members 31 and 32, and a coupled position, at which the coupling member 33 is meshed with both the gear members. In the present embodiment, the coupling member 33 is meshed with only the second gear member 32 when the speed reduction device 3 is in the disengaged state, and the coupling member 33 is meshed with the first gear member 31 and the second gear member 32 when the speed reduction device 3 is in the engaged state. FIG. 3A illustrates a state in which the coupling member 33 is at the non-coupled position. FIG. 3B illustrates a state in which the coupling member 33 is at the coupled position.

The coupling member 33 is disposed at the outer periphery of the shaft portion 322 of the second gear member 32 between the first gear member 31 and the second gear member 32, and moved in the axial direction in parallel with the rotational axis $O_2$ by the moving mechanism 34. In addition, the coupling member 33 integrally has a cylindrical body portion 331 and an engagement portion 332 with which an insertion member 342 of the moving mechanism 34 to be discussed later is engaged. The engagement portion 332 is an annular projection that projects radially inward from the inner peripheral surface of the body portion 331.

Outer peripheral splines 331a composed of a plurality of spline teeth are provided on the outer peripheral surface of the body portion 331 of the coupling member 33 at one end portion on the first gear member 31 side. Inner peripheral splines 331b composed of a plurality of spline teeth are provided on the inner peripheral surface of the body portion 331 of the coupling member 33 at the other end portion on the second gear member 32 side. In addition, the body portion 331 of the coupling member 33 is provided with a pair of axial grooves 331c that leads the insertion member 342 in the axial direction from the other end portion on the second gear member 32 side to a position at which the insertion member 342 abuts against the engagement portion 332.

When the coupling member 33 is at the non-coupled position or the coupled position, the inner peripheral splines 331b of the body portion 331 are meshed with the outer peripheral splines 322a of the second gear member 32 so that the coupling member 33 rotates together with the second gear member 32. When the coupling member 33 is at the coupled position, the outer peripheral splines 331a of the body portion 331 are meshed with the inner peripheral splines 314a of the first gear member 31. When the coupling member 33 is at the non-coupled position, the outer peripheral splines 331a and the inner peripheral splines 314a are disengaged from each other.

In this manner, the first gear member 31 and the second gear member 32 are coupled by the coupling member 33 so as to be relatively non-rotatable when the coupling member 33 is located at the coupled position, and the first gear member 31 and the second gear member 32 are relatively rotatable when the coupling member 33 is located at the coupled position. The outer peripheral splines 331a of the coupling member 33 and the inner peripheral splines 314a of the first gear member 31 constitute a meshing clutch 39 that transfers a drive force of the electric motor 2 to the second gear member 32 through meshing of their respective spline teeth.

The moving mechanism 34 has: a bar-shaped body 341, a part of which in the longitudinal direction is disposed in the shaft hole 320 of the second gear member 32; an insertion member 342 inserted through the pair of long holes 323 of the second gear member 32; a piston 343 that serves as a pressing member that applies a moving force in the axial direction to the bar-shaped body 341; a bearing 344 interposed between the piston 343 and the bar-shaped body 341; and a coil spring 345 that serves as a biasing member that biases the coupling member 33 in a direction that is opposite to the direction of pressing by the piston 343.

The bar-shaped body 341 integrally has a disk portion 341a that abuts against the bearing 344 outside the shaft hole 320, and a bar-shaped portion 341b that extends in the axial direction from the disk portion 341a to abut against the insertion member 342. The outside diameter of the bar-shaped portion 341b at an end portion on an abutment surface 341c side that abuts against the insertion member 342 is smaller than the outside diameter of the bar-shaped portion 341b at an end portion on the disk portion 341a side.

The insertion member 342 is in the shape of a circular column that extends in a direction that is orthogonal to the rotational axis $O_2$. Both end portions of the insertion member 342 project outward with respect to the outer peripheral surface of the shaft portion 322 of the second gear member 32 to be engaged with the engagement portion 332 of the coupling member 33. The coupling member 33 is moved in the axial direction with respect to the second gear member 32 together with the bar-shaped body 341 with the engagement portion 332 engaged with the insertion member 342. As illustrated as enlarged in FIG. 3A, the engagement portion 332 has a first side surface 332a that abuts against a side surface 342a of the insertion member 342, and a second side surface 332b that abuts against the coil spring 345.

A part of the piston 343 in the axial direction is housed in a third hydraulic chamber 503 provided in the fourth housing member 54. The piston 343 presses the bar-shaped body 341 via the bearing 344 using the pressure of working oil supplied from the hydraulic unit 6. As illustrated as enlarged in FIG. 3A, an annular groove 343a that houses an O-ring 30 for suppressing leakage of working oil from the third hydraulic chamber 503 is provided in the outer peripheral surface of the piston 343. In addition, a boss portion 343b is provided on a surface of the piston 343 that faces the disk portion 341a of the bar-shaped body 341 to project toward the disk portion 341a.

The bearing 344 is a thrust roller bearing that has a pair of bearing rings 344a and 344b, a plurality of rollers 344c, and a cage 344d that holds the rollers 344c, and is disposed at the outer periphery of the boss portion 343b of the piston 343. The bar-shaped body 341 is rotatable together with the second gear member 32 through the bearing 344 while receiving a moving force in the axial direction from the piston 343.

The coil spring 345 is disposed in an axially compressed state between the second side surface 332b of the engagement portion 332 of the coupling member 33 and the thrust bearing 38. As illustrated in FIG. 4, the thrust bearing 38 has: a first bearing ring 381 that abuts against one end portion of the coil spring 345; a second bearing ring 382 that abuts against one side surface 311a of the hub portion 311 of the first gear member 31; a plurality of rollers 383 disposed between the first bearing ring 381 and the second bearing ring 382; and a cage 384 that holds the rollers 383.

The coil spring 345 exerts its restoring force to bias the coupling member 33 toward the second gear portion 321. The biasing direction is the direction in which the outer peripheral splines 331a of the coupling member 33 and the inner peripheral splines 314a of the first gear member 31 are disengaged from each other. The insertion member 342 receives the restoring force of the coil spring 345 via the engagement portion 332 of the coupling member 33 to abut against the abutment surface 341c of the bar-shaped body 341.

Configuration of Hydraulic Unit

Figure 6:
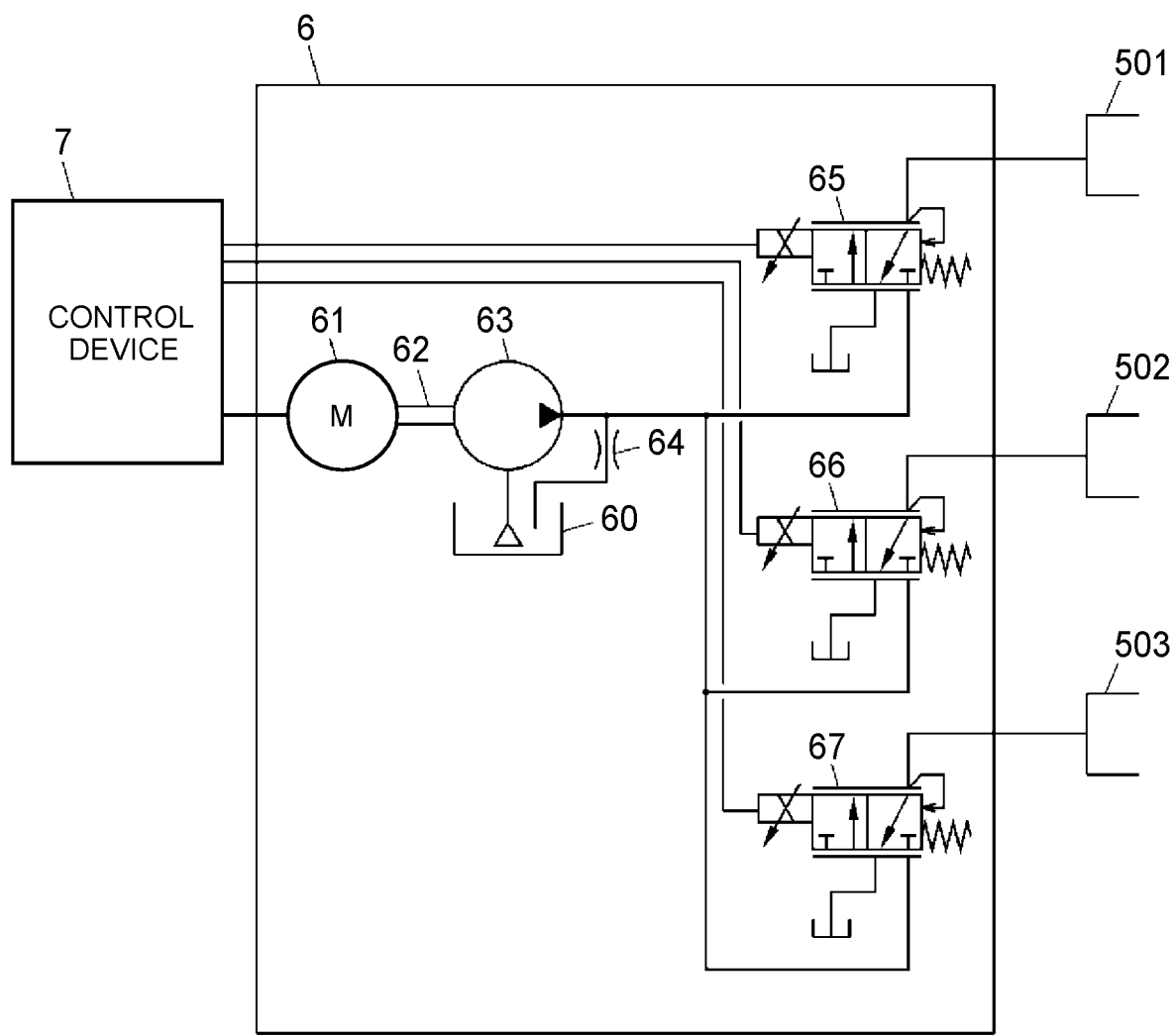
FIG. 6 is a circuit diagram illustrating an example of the configuration of a hydraulic unit.

Next, the configuration of the hydraulic unit 6 will be described with reference to FIG. 6. FIG. 6 is a circuit diagram illustrating an example of the configuration of the hydraulic unit 6. The hydraulic unit 6 has a pump motor 61 that generates torque that matches a current supplied from the control device 7, a hydraulic pump 63 coupled to the pump motor 61 by a coupling shaft 62, a relief valve 64, and first to third control valves 65 to 67, and outputs working oil for actuating the first and second pressing mechanisms 45 and 46 and the moving mechanism 34. The hydraulic pump 63 is driven by the pump motor 61, and draws up working oil from a reservoir 60 to discharge the working oil. The relief valve 64 is a fixed throttle valve that recirculates a part of the discharged working oil back to the reservoir 60.

The first to third control valves 65 to 67 are each a pressure control valve that regulates the pressure of working oil supplied to each of the first to third hydraulic chambers 501 to 503. The valve opening degree of the first to third control valves 65 to 67 is varied in accordance with a control current supplied from the control device 7.

The first control valve 65 has a supply port to which working oil is supplied from the hydraulic pump 63, and an output port from which working oil is output to the first hydraulic chamber 501. The first pressing mechanism 45 presses the first multi-plate clutch 43 toward the center plate 403 with a pressing force that matches the pressure of working oil supplied to the first hydraulic chamber 501. The second control valve 66 has a supply port to which working oil is supplied from the hydraulic pump 63, and an output port from which working oil is output to the second hydraulic chamber 502. The second pressing mechanism 46 presses the second multi-plate clutch 44 toward the center plate 403 with a pressing force that matches the pressure of working oil supplied to the second hydraulic chamber 502.

The third control valve 67 has a supply port to which working oil is supplied from the hydraulic pump 63, and an output port from which working oil is output to the third hydraulic chamber 503. The moving mechanism 34 moves the coupling member 33 from the non-coupled position to the coupled position using the pressure of working oil supplied to the third hydraulic chamber 503. The coupling member 33 is moved from the coupled position to the non-coupled position by the restoring force of the coil spring 345 when the pressure of working oil in the third hydraulic chamber 503 is lowered.

Control by Control Device

The control device 7 can control the first pressing mechanism 45, the second pressing mechanism 46, and the moving mechanism 34 by increasing and decreasing currents to be supplied to the pump motor 61 and the first to third control valves 65 to 67 of the hydraulic unit 6. In addition, the control device 7 can acquire various kinds of vehicle information through an in-vehicle communication network such as a controller area network (CAN), for example. The vehicle information includes information such as the wheel speeds of the right and left front wheels 101 and 102 and the right and left rear wheels 103 and 104, the depression amount of an accelerator pedal, and the steering angle of a steering wheel. The control device 7 stores information on a plurality of control maps that indicates the relationship between the vehicle information and the magnitude of a drive force to be output to each of the right and left rear wheels 103 and 104.

The control device 7 references the control maps based on the vehicle information in a four-wheel-drive state in which the right and left front wheels 101 and 102 and the right and left rear wheels 103 and 104 are driven, and calculates a drive force to be output from the first output rotary member 41 to the right rear wheel 103 as first command output torque and a drive force to be output from the second output rotary member 42 to the left rear wheel 104 as second command output torque. The control device 7 controls the electric motor 2, the first pressing mechanism 45, and the second pressing mechanism 46 such that a drive force that matches the first command output torque is output from the first output rotary member 41 and a drive force that matches the second command output torque is output from the second output rotary member 42.

In the two-wheel-drive state in which only the right and left front wheels 101 and 102 are driven, the control device 7 controls the moving mechanism 34 so as to bring the speed reduction device 3 into the disengaged state, which suppresses rotation of the electric motor 2 due to a reverse input from the right and left rear wheels 103 and 104. When the four-wheel-drive vehicle 1 travels straight in the two-wheel-drive state, the first and second pressing mechanisms 45 and 46 are controlled such that the first and second multi-plate clutches 43 and 44 are pressed, which can suppress relative rotation between the first output rotary member 41 and the second output rotary member 42 to enhance straight travel stability.

To bring the speed reduction device 3 from the disengaged state to the engaged state, the control device 7 rotates the second gear member 32 by transferring the rotational force of the first and second output rotary members 41 and 42 to the input rotary member 40 through the first and second multi-plate clutches 43 and 44. The control device 7 rotates the first gear member 31 by supplying a motor current to the electric motor 2, and synchronizes rotation of the first gear member 31 with rotation of the second gear member 32. The control device 7 moves the coupling member 33 from the non-coupled position to the coupled position by controlling the moving mechanism 34, to bring the speed reduction device 3 into the engaged state. The control device 7 can synchronize rotation of the first gear member 31 with rotation of the second gear member 32 by controlling the electric motor 2 such that the rotational speed of the first gear member 31 coincides with the rotational speed of the second gear member 32 which is calculated based on the wheel speeds of the right and left rear wheels 103 and 104.

Functions and Effects of First Embodiment

In the first embodiment described above, the first gear member 31 and the second gear member 32 are decoupled from each other by bringing the speed reduction device 3 into the disengaged state in the two-wheel-drive state. Thus, it is possible to suppress a power loss caused by the rotational resistance of the electric motor 2 due to a reverse input from the right and left rear wheels 103 and 104. The first gear member 31 and the second gear member 32 are decoupled from each other by the meshing clutch 39 (the outer peripheral splines 331a of the coupling member 33 and the inner peripheral splines 314a of the first gear member 31). Therefore, it is possible to significantly suppress drag torque and reliably suppress rotation of the electric motor 2 due to a reverse input compared to a case where the electric motor 2 is caused not to be rotated by only disengaging the first and second multi-plate clutches 43 and 44, or a case where the electric motor 2 is caused not to be rotated by providing a multi-plate clutch in a path that leads from the output shaft 20 of the electric motor 2 to the input rotary member 40 of the drive force distribution device 4 and disengaging the multi-plate clutch, for example.

In the first embodiment described above, the moving force of the piston 343 is transferred to the coupling member 33 by the bar-shaped body 341 that is disposed in the shaft hole 320 of the second gear member 32, which can suppress an increase in the size of the speed reduction device 3 and contribute to a reduction in the weight of the device as well. With the bearing 344 disposed between the bar-shaped body 341 and the piston 343, further, the bar-shaped body 341 is smoothly rotatable together with the second gear member 32 while receiving a moving force in the axial direction from the piston 343.

In the first embodiment described above, the first pressing mechanism 45, the second pressing mechanism 46, and the moving mechanism 34 are actuated by working oil supplied from the hydraulic unit 6. Thus, the size and the cost of the drive device 10 can be reduced compared to a case where such mechanisms are actuated by electromagnetic actuators, for example. The hydraulic unit 6 supplies working oil discharged from the single hydraulic pump 63 from the first to third control valves 65 to 67 to the first to third hydraulic chambers 501 to 503, respectively. Thus, the size and the cost of the hydraulic unit 6 can also be reduced.

Second Embodiment

Figure 7A:
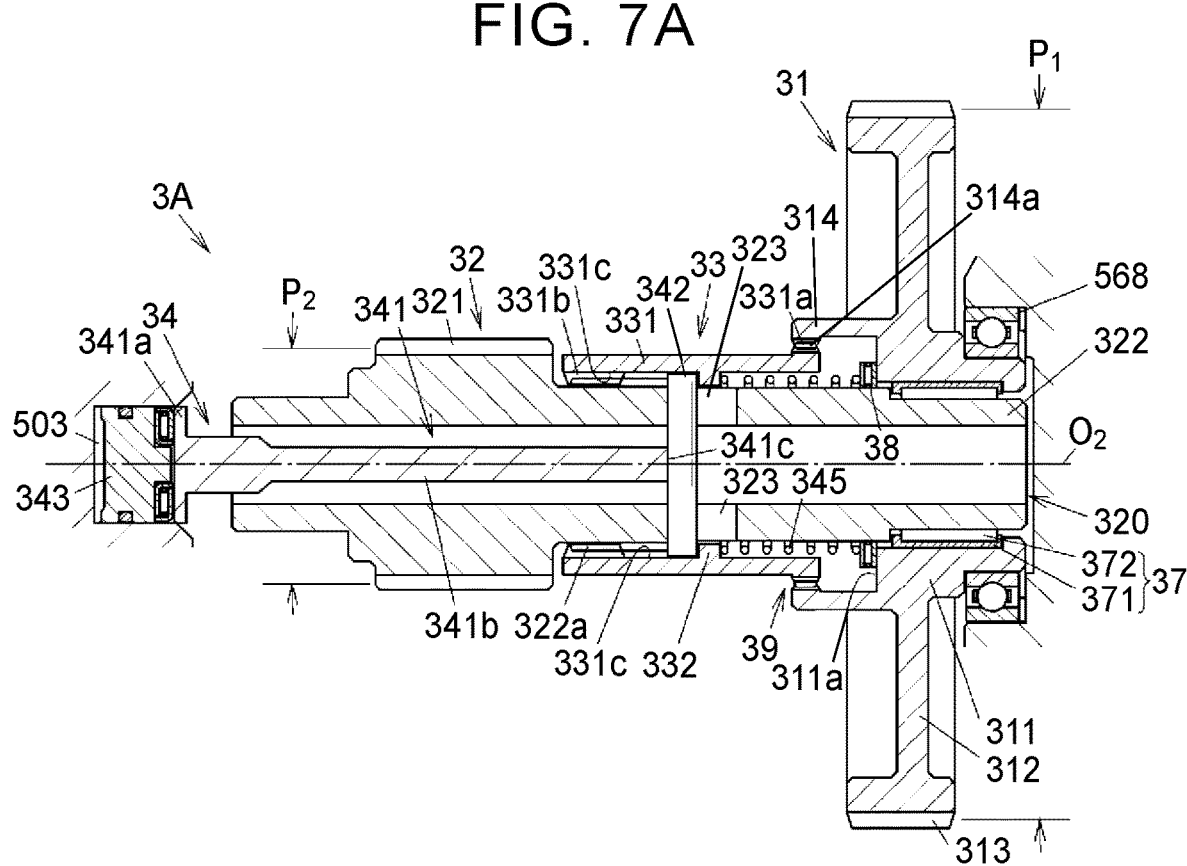
FIG. 7A is a sectional view of a speed reduction device according to a second embodiment in an engaged state.
Figure 7B:
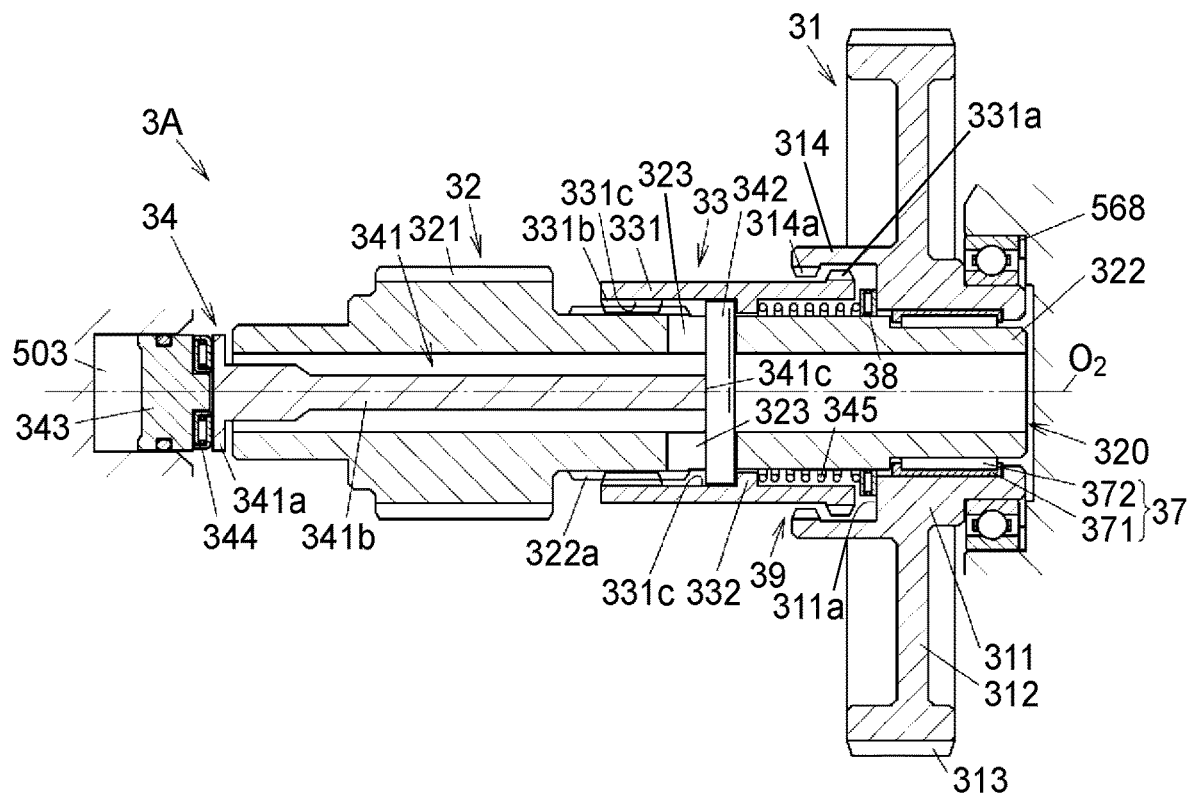
FIG. 7B is a sectional view of the speed reduction device according to the second embodiment in a disengaged state.

Next, a second embodiment of the present disclosure will be described with reference to FIGS. 7A and 7B. FIG. 7A is a sectional view of a speed reduction device 3A according to the second embodiment in an engaged state. FIG. 7B is a sectional view of the speed reduction device 3A according to the second embodiment in a disengaged state. The speed reduction device 3A is configured roughly similarly to that according to the first embodiment, but is different from that according to the first embodiment in the positional relationship between the outer peripheral splines 331a of the coupling member 33 and the inner peripheral splines 314a of the first gear member 31 which constitute the meshing clutch 39.

In the first embodiment, the speed reduction device 3 is brought into the engaged state when the coupling member 33 is moved to the first gear member 31 side by the moving force of the piston 343 with working oil supplied to the third hydraulic chamber 503, and the speed reduction device 3 is brought into the disengaged state when the coupling member 33 is moved in the direction away from the first gear member 31 by the restoring force of the coil spring 345. In the present embodiment, on the contrary, the speed reduction device 3 is brought into the disengaged state when the coupling member 33 is moved to the first gear member 31 side, and the speed reduction device 3 is brought into the engaged state when the coupling member 33 is moved in the direction away from the first gear member 31.

Therefore, the outer peripheral splines 331a of the coupling member 33 are provided at a position at which the outer peripheral splines 331a are meshed with the inner peripheral splines 314a of the first gear member 31 when the coupling member 33 is moved away from the first gear member 31 and at which meshing between the outer peripheral splines 331a and the inner peripheral splines 314a of the first gear member 31 is canceled when the coupling member 33 is moved to the first gear member 31 side. More specifically, the outer peripheral splines 331a are configured to be positioned more toward the side surface 311a of the hub portion 311 than the inner peripheral splines 314a when the coupling member 33 is moved to the first gear member 31 side.

Also with the second embodiment, the same function and effect as those of the first embodiment can be achieved. In addition, it is not necessary to supply working oil to the third hydraulic chamber 503 when the speed reduction device 3 is in the engaged state. Thus, power consumed by the hydraulic unit 6 can be reduced in the case where the vehicle travels for a long time in the four-wheel-drive state.

While the present disclosure has been described above based on the first and second embodiments, such embodiments do not limit the disclosure according to the claims. It should be noted that all combinations of the characteristics described in relation to the embodiments are not necessarily essential to address the issue of the disclosure.

The present disclosure can be modified, as appropriate, without departing from the scope and spirit of the present disclosure. For example, while the coupling member 33 is meshed with the second gear member 32 when the coupling member 33 is at the non-coupled position in the first and second embodiments described above, the present disclosure is not limited thereto. The coupling member 33 may be modified so as to be meshed with the first gear member 31 when the coupling member 33 is at the non-coupled position.

What is claimed is:

1. A drive device for a vehicle, comprising:
   an electric motor;
   a speed reduction device configured to reduce a speed of rotation transferred from the electric motor; and
   a drive force distribution device that distributes and outputs a drive force of the electric motor that is input via the speed reduction device to a first output rotary member and a second output rotary member,
   wherein the speed reduction device includes:
      a first gear member having a first gear portion that has a first pitch circle diameter;
      a second gear member supported coaxially with the first gear member so as to be rotatable relative to the first gear member and having a second gear portion that has a second pitch circle diameter that is different from the first pitch circle diameter, wherein the second gear member is in a shape of a cylinder in which a shaft hole is provided at a central portion of the cylinder;

a coupling member disposed so as to be movable in an axial direction between a non-coupled position at which the coupling member is meshed with only one of the first gear member and the second gear member and a coupled position at which the coupling member is meshed with both the first gear member and the second gear member; and a moving mechanism having a body and configured to move the coupling member in the axial direction together with the body, wherein at least a part of the body of the moving mechanism in a longitudinal direction is disposed in the shaft hole.

2. The drive device according to claim 1, wherein:

the second gear member is provided with a hole that extends between inner and outer peripheral surfaces of the second gear member so as to extend in the axial direction;

the moving mechanism has an insertion member inserted into the hole and configured to abut against the body; and the coupling member is disposed at an outer periphery of the second gear member, and configured to be engaged with the insertion member and configured to be moved in the axial direction together with the body.

3. The drive device according to claim 1, wherein:

the moving mechanism has a pressing member configured to apply a moving force in the axial direction to the body, and a bearing interposed between the pressing member and the body; and the body is configured to rotate together with the second gear member while receiving the moving force.

4. The drive device according to claim 1, wherein:

the drive force distribution device includes an input rotary member to which the drive force of the electric motor is input, a first multi-plate clutch disposed between the input rotary member and the first output rotary member, a second multi-plate clutch disposed between the input rotary member and the second output rotary member, a first pressing mechanism configured to press the first multi-plate clutch, and a second pressing mechanism configured to press the second multi-plate clutch;

the drive device further includes a hydraulic unit configured to output working oil to be supplied to the first pressing mechanism, the second pressing mechanism, and the moving mechanism; and the hydraulic unit includes a first control valve configured to output working oil to be supplied to the first pressing mechanism, a second control valve configured to output working oil to be supplied to the second pressing mechanism, a third control valve configured to output working oil to be supplied to the moving mechanism, and a pump configured to supply working oil to the first control valve, the second control valve and the third control valve.

* * * * *